Patented July 20, 1926.

1,592,989

UNITED STATES PATENT OFFICE.

HARRY E. NOLAN, OF DES MOINES, IOWA, ASSIGNOR OF ONE-HALF TO E. D. GRIFFITHS, OF DES MOINES, IOWA.

COAL-TREATING PROCESS AND PRODUCT THEREFOR.

No Drawing. Applicatoin filed February 7, 1925. Serial No. 7,709.

An object of this invention is to provide an improved process of and product for treating coal for fuel, whereby to increase and enhance the heating value of the fuel, minimize the accumulation of ash, and prevent the formation of soot and scale in smoke flues and boiler tubes using said coal as fuel, and thus economizing in the use of said coal.

My invention consists in the process and product hereinafter set forth and pointed out in my claims.

My product or composition of matter preferably is composed of ingredients and in the proportions substantially as hereinafter specified, as follows:

| | Per cent. |
|---|---|
| Common salt | 68 |
| Soda bicarbonate | 13 |
| Commercial sulphur | 5 |
| Napthaline flake | 5 |
| American vermillion red | 5 |
| Powdered metallic zinc | 4 | constituting one unit of substantially one and one-half pounds avoirdupois.

The ingredients herein mentioned are mixed dry and then poured into a receptacle with substantially four and one-half gallons of water. The water is preferably near boiling temperature. A chemical reaction takes place and the mixture of the ingredients with the water is such as to give me the desired solution. While the ingredients to wit; sulphur, napthaline, American vermillion and powdered zinc are not entirely soluble in water yet there is a chemical reaction that takes place that causes the chemicals above mentioned to be fused in the water. Whatever chemicals are not dissolved are of such fine particles that practically they are in the solution and may be poured out as ordinary liquid solution. The solution or liquid substance thus formed and produced is sprinkled on and allowed to coat and saturate the dust of substantially two thousand pounds avoirdupois weight of coal. The coal preferably is broken to a three-inch size and less before the solution is applied thereto. The coal may be of bituminous kind. The coal is then used as fuel. The coal may be banked in a furnace by the use of ashes treated as above noted and said ashes, so treated, will be in major part consumed.

I claim as my invention—

1. A product for treating coal, composed of salt, soda bicarbonate, commercial sulphur, napthaline flake, vermillion red, powdered metallic zinc mixed with water, substantially in the proportions specified.

2. A product adapted to be mixed with water for treating coal, composed of salt, soda bicarbonate, commercial sulphur, napthaline flake, vermillion red and powdered metallic zinc, substantially in the proportions specified.

3. A liquid composition for treating coal; comprising a compound consisting substantially of common salt 68%, soda bicarbonate 13%, commercial sulphur 5%, napthaline flake 5%, American vermillion red 5% and powdered metallic zinc 4%, substantially one and one-half pounds avoirdupois of said compound, treated with substantially four and one-half gallons of hot water, said composition being adapted to be sprinkled on coal, the amount substantially as specified being applied to substantially two thousand pounds avoirdupois of coal, said coal being broken to three-inch size and less.

HARRY E. NOLAN.